Figure 1:
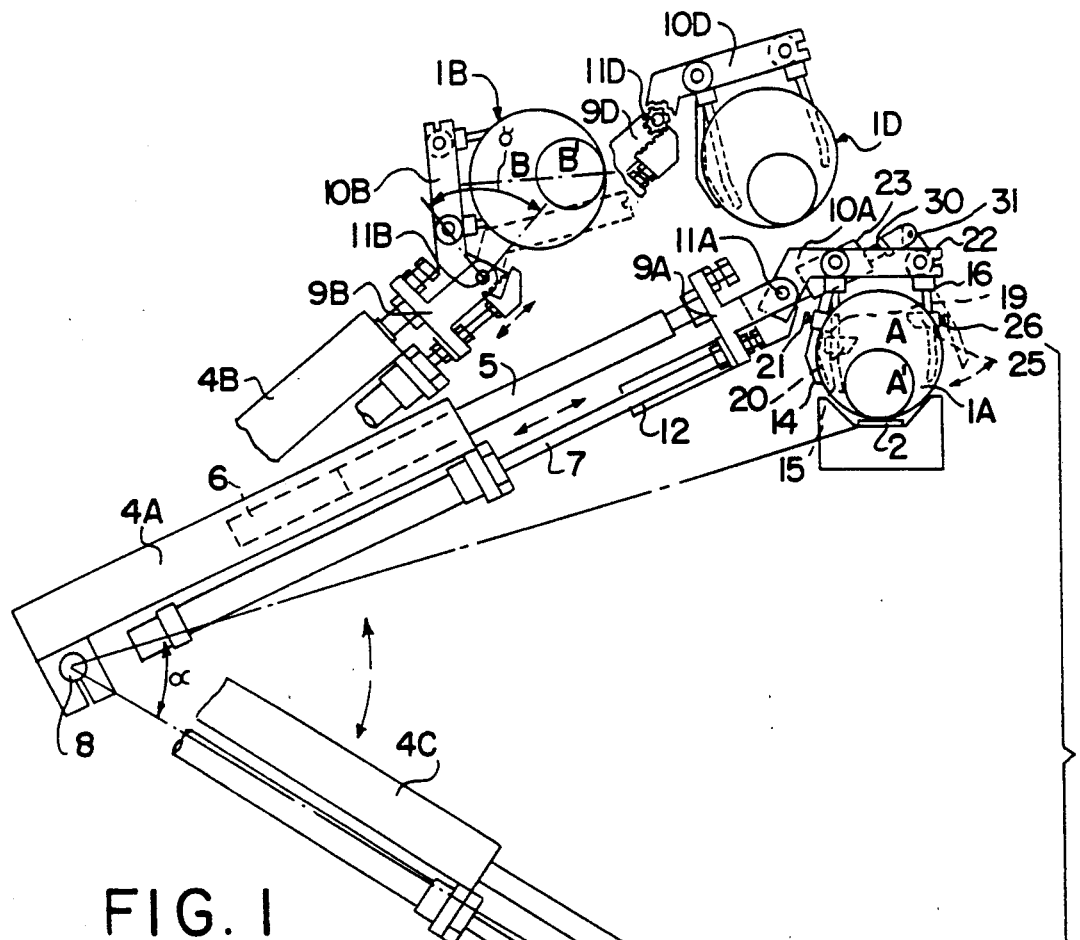

United States Patent [19]

Meroni et al.

[11] Patent Number: 5,092,532
[45] Date of Patent: Mar. 3, 1992

[54] DEVICE FOR FEEDING AN EMPTY CONICAL TUBE TO A BOBBIN SUPPORT ARM AND POSITIONING IT THEREON

[75] Inventors: Roberto Meroni, Pordenone; Danny Lant, Basiliano; Umberto Gerin, Pordenone; Fabio Lancerotto, Milan; Vittorio Colussi, Pordenone, all of Italy

[73] Assignee: Savio S.p.A., Pordenone, Italy

[21] Appl. No.: 509,576

[22] Filed: Apr. 16, 1990

[30] Foreign Application Priority Data

Apr. 21, 1989 [IT] Italy ................. 20256 A/89

[51] Int. Cl.⁵ ............... B65H 67/04; B65H 67/06
[52] U.S. Cl. ...................... 242/35.5 A; 242/18 DD
[58] Field of Search ............ 242/35.5 A, 35.5 R, 242/18 R, 35.6 R, 18 PW, 18 DD

[56] References Cited

U.S. PATENT DOCUMENTS 2,692,269 10/1954 Newberg ................. 214/151
3,971,520 7/1976 Shimai .
4,352,466 10/1982 Baumges et al. .......... 242/35.5 A X
4,399,951 8/1983 Preuhs ................. 242/35.5 A X
4,534,517 8/1985 Muramatsu .
4,595,151 6/1986 Slavik et al. .
4,598,881 7/1986 Lattion ..................... 242/35.5 A
4,606,508 8/1986 Gartner ................. 242/35.5 A X

FOREIGN PATENT DOCUMENTS 0110275 6/1984 European Pat. Off. .
0285186 10/1988 European Pat. Off. .
3726508 12/1988 Fed. Rep. of Germany .
724789 2/1955 United Kingdom .

Primary Examiner—Stanley N. Gilreath
Attorney, Agent, or Firm—Shea & Gould

[57] ABSTRACT

A device for feeding a conical tube to a bobbin support arm and positioning it thereon, consisting of a rotatable extendable arm having an articulated wrist provided with three fingers which grip the picked-up tube, the axes of rotation of the arm and wrist being both parallel to the axis of the bobbin drive cylinder.

5 Claims, 1 Drawing Sheet 5,092,532

DEVICE FOR FEEDING AN EMPTY CONICAL TUBE TO A BOBBIN SUPPORT ARM AND POSITIONING IT THEREON

This invention relates to a device for feeding a conical tube to a bobbin support arm and positioning it thereon.

It is known from the art that in yarn production and processing operations the yarn is made up into bobbins wound on cardboard, plastic or other tubes, which are clamped between the holding centres of a bobbin support arm and then rested against a right drive cylinder along a common generator.

When the cylinder rotates the tube also rotates, to collect the produced yarn by winding it about the tube to form the bobbin. In most cases the tubes and the bobbins wound on them have a certain taper to facilitate the subsequent unwinding of the yarn. In such cases the tube must be presented into contact such that a horizontal generator thereof coincides with the cylinder generator and hence with its axis correctly inclined to the drive cylinder. The technical problem which the present invention solves is to pick up the tube from a position in space by means of an automatic device and move it towards a delivery position to present it to the holding centres of the bobbin support arm with correct spatial inclination such that with one of its generators the tube is tangential to the generator of the drive cylinder. In this respect, it should be noted that external random contact between a cone and a cylinder would be limited to a point if the axes of the two bodies were not in a precise spatial relationship.

Figure 2:
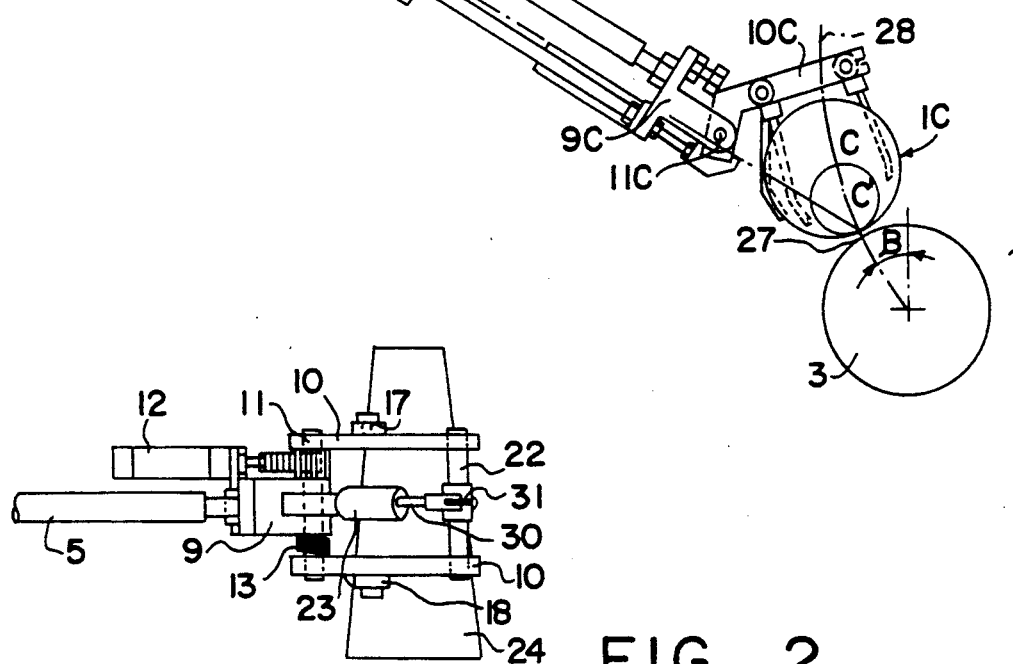

Referring now to a preferred embodiment of the invention and first to the drawings which accompany this application:

FIG. 1 is a side elevational view illustrating four different positions of a preferred embodiment of the device of the present invention during its operation;

In the initial position (indicated by "A") the tube lies on a belt and the device is the process of gripping the tube;

In the second position indicated by "D" the first intermediate position of the device is illustated in which the tube is raised from belt 2 by rotating an arm 4 about pivot 8 of the device of the invention;

In the third position indicated by "B" a further intermediate position of the device is illustrated in which the arm 4 is retracted by means of the member 7 and the brackets 10 are rotated about shaft 11 by means of cylinder 12 of the device of the invention;

In the fourth position indicated by "C" the tube delivery position of the device is illustrated in which the tube is positioned tangentially to the drive cylinder; and FIG. 2 is a plan view of the bracket assembly of the device shown in FIG. 1.

With reference to FIg. 1. the tube 1 is fed for example by the conveyor belt 2 while it lies with a generator horizontally on said belt, and is to be positioned in the position 1C tangential to the generator 27 at the drive cylinder 3, along a plane of tangency which is generally not horizontal but variously inclined. In other words, the tube has to be moved from its initial position to the delivery position while displacing the inclination of the tube axis, indicated by the line joining the centres of the two base circles of the tube cone, from the position AA to the position CC.

The device according to the invention consists of an arm 4 provided with a directional guide 5 which penetrates into and withdraws from a cavity 6 provided in the arm 4 to direct an extendable member 7, which can consist of a pneumatic or hydraulic system, or a mechanical rack system.

Said arm 4 is also provided with a pivot 8 of horizontal axis which allows it to undergo controlled rotation in a vertical plane by an operating system of known type, not shown in the figure. At its end 9 the arm 4 is provided with a pair of brackets 10 able to rotate in a vertical plane about the axis of a pin 11 provided with a gear, under the action for example of the pneumatic cylinder 12 opposed by a return spring 13.

In FIG. 1 the tube has its major base facing the reader and thus its cavity is visible.

The member by which the arm 4 grips the tube 1, and consisting of a plurality of and preferably three opposing fingers 14, 15 and 16, is disposed on the brackets 10.

The two fingers 14 and 15 are fixed to the couplings 17 and 18 so that the tube 1 is contacted by their ends and by the locator members 19 and 20, the position of which is adjusted by means of threaded setscrews 21 on the basis of the tube shape (taper and size).

The opposite finger 16 is mounted on the shaft 22 and can open and close under the action of the pneumatic cylinder 23 against a return spring, not shown on the figure, by rotating about the axis 24 of the shaft 22. The pneumatic cylinder 23 is connected to pin or shaft 11 as shown in FIG. 1, position A, and in FIG. 2. The piston rod 30 of the cylinder 23 is connected to an extension 31 of finger 16 mounted on the shaft 22 (please see position A in FIG. 1 and Fig. 2). The tube 1 is also contacted by the end of the finger 16 and by its locator 25, which is adjustable by means of the threaded setscrew 26.

The gripping action of the three fingers 14, 15 and 16 is correct and precise and enables the tube 1 to be returned to alignment should it have rested skew on the conveyor belt 2, i.e. if it had rested with its generator inclined to the direction of movement of the belt 2.

When the three-finger gripper member has gripped the tube 1 it is raised by rotating the arm 4 about the pivot 8 and then withdrawn by retracting the extendable member 7.

The pair of brackets 10 is rotated into position 10B by the action of the cylinder 12. In this manner the "wrist" of the arm 4 rotates to cause the tube to assume position 1B, which in consideration of the rotation undergone about 8 represents the correct position for tangency with the drive cylinder 3 at the point 27. The "wrist" of arm 4 comprises the brackets 10 rotatable about shaft 11, the associated tube gripping elements 14, 15, 16 and the shaft 22. Thus, the "wrist" can be pivoted about shaft 11 by the action of cylinder 12.

The rotation which the wrist has to undergo in order to present the tube in the correct position corresponds to an angle $\gamma$ equal to the algebraic sum of the angle $\alpha$, which expresses the clockwise rotation between the generator along which the picked-up tube 1 rests and the generator along which the delivered tube 1C makes contact, and the angle $\beta$, which expresses the anticlockwise angular distance between the generator along which it rests on the cylinder 3 and the vertical.

In FIG. 1 the angle $\gamma$ is about 80°, whereas the angle $\alpha$ is about 50° and the angle $\beta$ about 30°.

After being raised and retracted and the "wrist" rotated to bring the brackets 10 into position 10B, the arm 4 is rotated downwards and extended outwards so that the tube becomes located with its surface tangential to the circle having its centre coinciding with the axis of the pivot 8 and its radius just less (by a few millimetres) than the distance between the axis of the pivot 8 and the desired point of tangency 27 between the cylinder 3 and tube 1C. The brackets 10 are now in position 10C. When in this position the tube 1C is clamped between the holding centres of the bobbin support arm which is ready to receive it. When the tube has been clamped between the holding centres, the fingers 14, 15 and 16 release the tube. The arm 4 can rise and return to its rest position. Then when the winding of the new bobbin is to commence, the bobbin suport arm moves the tube 1C through the trajectory 28 to cover the very small distance which separates it from the cylinder 3, so that it now rests on 3.

The brackets 10 can be rotated into position 10B at any intermediate time or stage between the picking-up of the tube 1 from the belt 2 and its delivery to the bobbin support arm at a point substantially coinciding with 27, provided the obstacles along the path are taken into consideration.

We claim:

1. A device for feeding conical tubes having generators from a source in which the generators of the tubes lie in an essentially horizontal position to a drive cylinder where the generators are positioned tangentially thereto for rotation thereby, comprising an arm rotatable about a pivot in a vertical plane, a member connected to said arm for extending and retracting said arm, bracket means connected to said arm by a pin wherein said bracket means carry at least three gripping fingers for gripping, picking up, delivering and releasing a tube, and rotation means connected to said bracket means and said arm for rotation of said bracket means in a vertical plane about said pin and relative to said arm to thereby provide an articulated wrist, and wherein the axes of said pivot and pin are parallel to the axis of the drive cylinder.

2. A device for feeding conical tubes as claimed in claim 1, comprising three fingers, two being fixed and the third opposing the other two and being rotatably connected to said bracket means.

3. A device for feeding conical tubes as claimed in claim 2, wherein each of the fingers is adapted to engage a tube with their end portions and wherein each finger includes an adjustable locator member above each of said end portions.

4. A device for feeding conical tubes as claimed in claim 3, wherein each of said locator members includes means for adjusting said locator members in accordance with the shape and size of the tubes to be handled.

5. A device for feeding conical tubes as claimed in claim 1, wherein said rotation means rotates said articulated wrist in a counterclockwise direction relative to said arm after gripping a tube, wherein said arm pivots in a clockwise direction for delivery of the tube, wherein the drive cylinder has a horizontal axis and a vertical axis normal thereto, and wherein the angle of said rotation of said wrist represented by the angle $\gamma$ is equal to the algebraic sum of the angle of said rotation of said arm from the gripping of the tube to the delivery of the tube represented by the angle $\alpha$ and an arcuate counterclockwise angle between said vertical axis of the drive cylinder and the generator of the tube resting on the periphery of the drive cylinder represented by the angle $\beta$.

* * * * *